(12) United States Patent
Ando et al.

(10) Patent No.: US 9,430,099 B2
(45) Date of Patent: *Aug. 30, 2016

(54) TOUCH PANEL, AND TOUCH-TYPE INPUT APPARATUS AND CONTROL METHOD THEREFOR

(71) Applicant: Murata Manufacturing Co., Ltd., Nagaokakyo-shi, Kyoto-fu (JP)

(72) Inventors: Masamichi Ando, Nagaokakyo (JP); Yoshiro Tajitsu, Suita (JP); Mitsunobu Yoshida, Sodegaura (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/887,443

(22) Filed: Oct. 20, 2015

(65) Prior Publication Data

US 2016/0041694 A1    Feb. 11, 2016

Related U.S. Application Data

(63) Continuation of application No. 14/729,122, filed on Jun. 3, 2015, which is a continuation of application No. 13/668,487, filed on Nov. 5, 2012, now Pat. No. 9,110,532, which is a continuation of application No. PCT/JP2011/059919, filed on Apr. 22, 2011.

(30) Foreign Application Priority Data

May 6, 2010  (JP) ................................. 2010-106119
Aug. 9, 2010  (JP) ................................. 2010-178304

(51) Int. Cl.
G06F 3/043  (2006.01)
G06F 3/038  (2013.01)

(Continued)

(52) U.S. Cl.
CPC ............. *G06F 3/0433* (2013.01); *G06F 3/038* (2013.01); *G06F 3/041* (2013.01); *G06F 3/0414* (2013.01); *G09G 5/003* (2013.01); *G06F 2203/04104* (2013.01); *G09G 2300/0404* (2013.01)

(58) Field of Classification Search
CPC ................. G06F 3/038; G06F 3/0414; G06F 2203/04104
USPC ............... 345/156–184; 296/24, 34, 37.8; 381/152, 190; 178/18.01–18.06, 19.07
See application file for complete search history.

(56) References Cited

U.S. PATENT DOCUMENTS 4,315,433 A   2/1982  Edelman et al.
4,634,917 A *  1/1987  Dvorsky ............... G01B 7/004
                                                  310/323.21

(Continued)

FOREIGN PATENT DOCUMENTS

CN    101124535 A    2/2008
CN    101630214 A    1/2010

(Continued)

OTHER PUBLICATIONS

PCT/JP2011/059919 Written Opinion dated Aug. 2, 2011.

*Primary Examiner* — Prabodh M Dharia
(74) *Attorney, Agent, or Firm* — Arent Fox LLP

(57) ABSTRACT

A touch panel having a piezoelectric sheet with a first region and a second region, and a surface protection film bonded to the second region of the piezoelectric sheet with a non-curable adhesive. The non-curable adhesive has a larger elasticity than a material that bonds the first region of the piezoelectric sheet to the surface protection film.

12 Claims, 11 Drawing Sheets

(51) Int. Cl.
*G06F 3/041* (2006.01)
*G09G 5/00* (2006.01)

(56) References Cited

U.S. PATENT DOCUMENTS

| | | | |
|---|---|---|---|
| 5,052,777 A | 10/1991 | Ninnis et al. | |
| 5,213,880 A * | 5/1993 | Yaguchi | C08G 79/025 428/217 |
| 5,515,738 A | 5/1996 | Tamori | |
| 6,449,082 B1 * | 9/2002 | Agrawal | G02F 1/155 250/214 SG |
| 6,593,917 B2 | 7/2003 | Toda | |
| 6,713,125 B1 * | 3/2004 | Sherwood | B29C 71/0009 427/157 |
| 6,782,303 B1 * | 8/2004 | Fong | B29C 67/0059 700/118 |
| 6,879,318 B1 * | 4/2005 | Chan | G02F 1/133308 178/18.01 |
| 6,916,441 B2 * | 7/2005 | Newell | B29C 67/0092 264/340 |
| 6,979,050 B2 | 12/2005 | Browne | |
| 7,119,798 B2 | 10/2006 | Yoshikawa et al. | |
| 7,932,900 B2 | 4/2011 | Sano et al. | |
| 8,098,418 B2 * | 1/2012 | Paolini, Jr. | G02F 1/167 345/49 |
| 8,183,751 B2 | 5/2012 | Tajitsu et al. | |
| 8,194,053 B2 | 6/2012 | Kim et al. | |
| 8,241,653 B1 | 8/2012 | Hossainy | |
| 8,363,863 B2 | 1/2013 | Andoh et al. | |
| 8,451,231 B2 * | 5/2013 | Choo | G06F 3/0436 178/18.04 |
| 2004/0095046 A1 | 5/2004 | Ouchi et al. | |
| 2005/0073505 A1 | 4/2005 | Katsuki et al. | |
| 2005/0099401 A1 | 5/2005 | Matsumoto et al. | |
| 2005/0151442 A1 | 7/2005 | Kihara et al. | |
| 2005/0212775 A1 | 9/2005 | Lee | |
| 2005/0227099 A1 | 10/2005 | Hiruma | |
| 2005/0243071 A1 | 11/2005 | Kent et al. | |
| 2005/0275347 A1 * | 12/2005 | Liang | H05B 33/28 313/506 |
| 2006/0071911 A1 | 4/2006 | Sullivan | |
| 2008/0018201 A1 | 1/2008 | Matsumoto | |
| 2008/0030483 A1 * | 2/2008 | Choo | G06F 3/0436 345/173 |
| 2009/0084190 A1 | 4/2009 | Sugahara | |
| 2009/0167704 A1 | 7/2009 | Terlizzi | |
| 2009/0207216 A1 | 8/2009 | Okubo | |
| 2009/0293631 A1 | 12/2009 | Radivojevic | |
| 2010/0066113 A1 | 3/2010 | Browne et al. | |
| 2010/0072858 A1 | 3/2010 | Ando et al. | |
| 2010/0097428 A1 | 4/2010 | Owaki | |
| 2011/0050586 A1 | 3/2011 | Miller et al. | |
| 2011/0102342 A1 * | 5/2011 | Iwawaki | G06F 1/1626 345/173 |
| 2011/0109204 A1 | 5/2011 | Tajitsu et al. | |
| 2011/0128245 A1 | 6/2011 | Andoh et al. | |
| 2012/0144925 A1 | 6/2012 | Radivojevic | |
| 2013/0082970 A1 | 4/2013 | Frey et al. | |
| 2013/0228463 A1 | 9/2013 | Ando | |

FOREIGN PATENT DOCUMENTS

| | | |
|---|---|---|
| JP | 5-061592 A | 3/1993 |
| JP | 05-143219 A | 6/1993 |
| JP | 06-324784 A | 11/1994 |
| JP | 07-160396 A | 6/1995 |
| JP | 2006-039667 A | 2/2006 |
| JP | 2006-163618 A | 6/2006 |
| JP | 2010089496 A | 4/2010 |

* cited by examiner

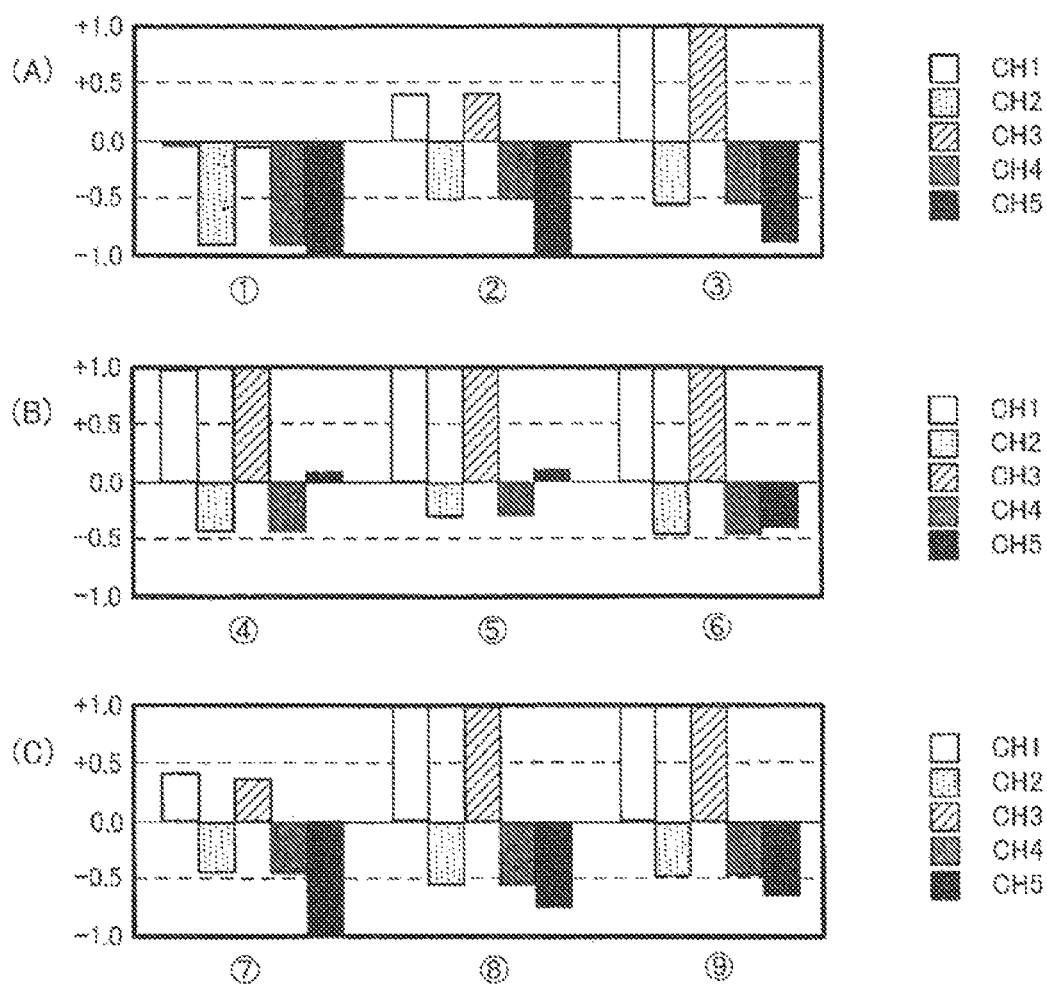

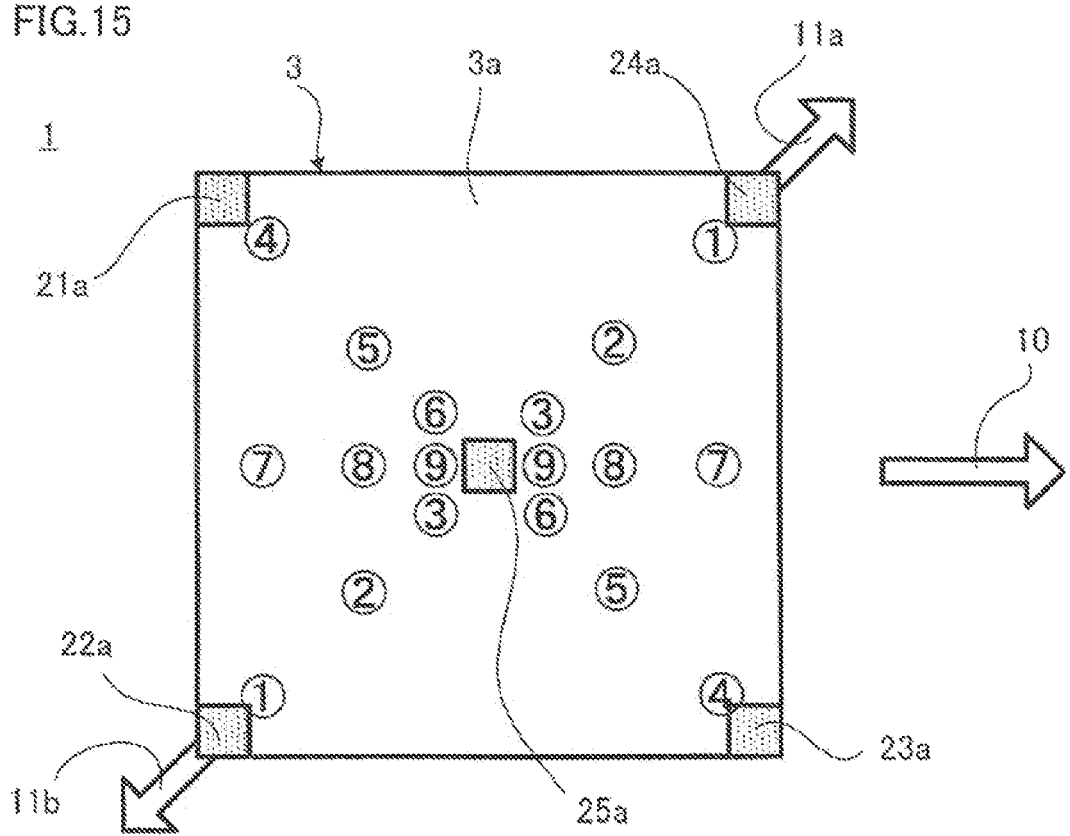

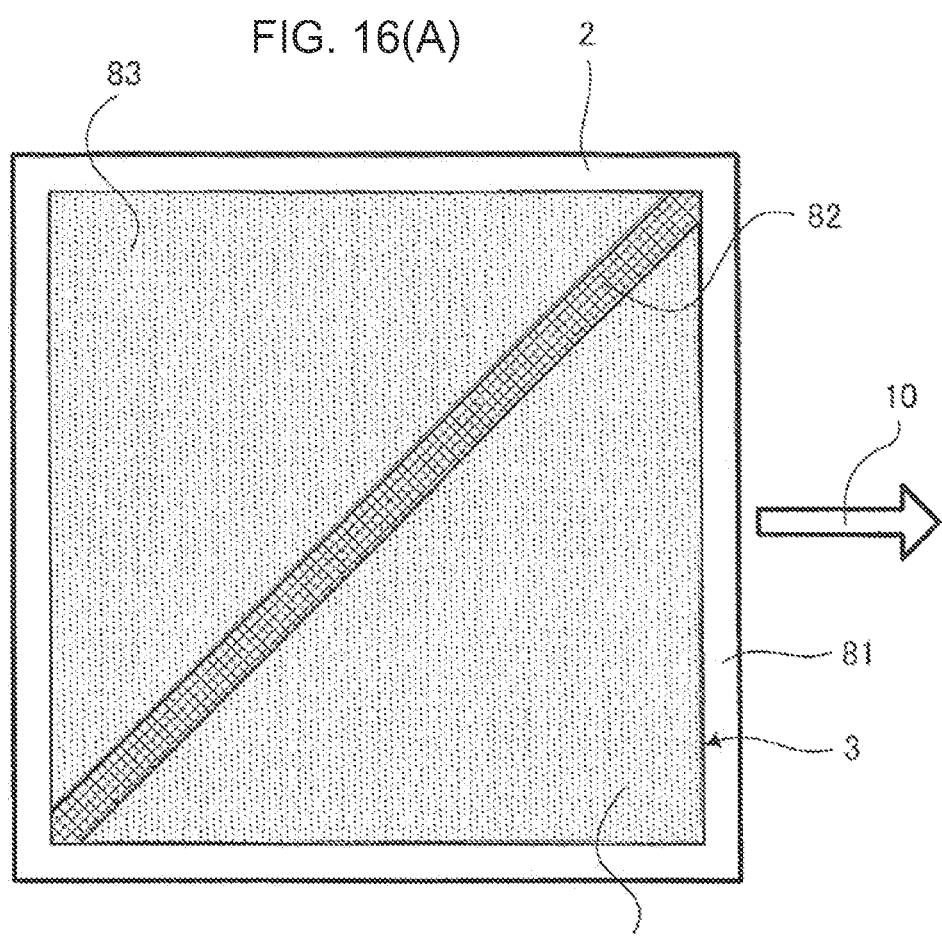
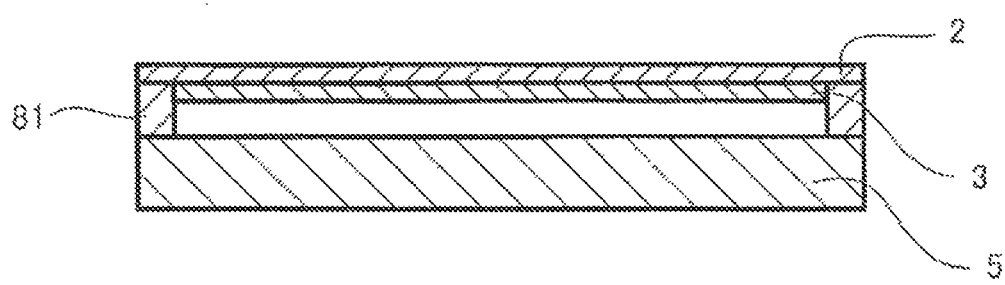

TOUCH PANEL, AND TOUCH-TYPE INPUT APPARATUS AND CONTROL METHOD THEREFOR

CROSS REFERENCE TO RELATED APPLICATIONS

The present application is a continuation of application Ser. No. 14/729,122, filed Jun. 3, 2015, which is a continuation of application Ser. No. 13/668,487, filed Nov. 5, 2012, now U.S. Pat. No. 9,110,532, which is a continuation of International application No. PCT/JP2011/059919, filed Apr. 22, 2011, which claims priority to Japanese Patent Application No. 2010-106119, filed May 6, 2010, and Japanese Patent Application No. 2010-178304, filed Aug. 9, 2010, the entire contents of each of which are incorporated herein by reference.

FIELD OF THE INVENTION

The present invention relates to a touch panel, and a touch-type input apparatus and a control method therefor, and in particular to a touch panel containing a piezoelectric sheet, and a touch-type input apparatus configured by using the same, and a control method therefor.

BACKGROUND OF THE INVENTION

In recent years, input devices employing a so-called touch panel system, namely touch-type input devices have greatly increased. Not only for automatic teller machines (ATM) at banks and ticket-vending machines at stations, but also for portable phones, portable game machines and portable music players, the touch panel system has been increasingly employed as an input interface in association with the development in the thin display art.

A majority of touch panels that are currently used are based on the resistance film system or the electrical capacitance system, and besides these, those based on the optical system, electromagnetic induction system, and those utilizing surface acoustic waves by piezoelectricity are known. Usually, positional information is detected by means of these systems. To be more specific, the position where the operator touches (presses) on the touch panel is acquired as coordinate information, and a specified process is executed based on this information. As represented by a bank ATM, an operator of the device is able to operate it as if he/she pressed an actual button by touching the part of a button displayed on the screen. As a result of recent development in graphic user interface (GUI) processing technique, there is also known a device that enables a user to scroll the displayed image by stroking the screen, or to directly control a graphically-displayed slide switch with a finger.

In terminal information devices represented by "iPhone (registered trade name)", a so-called multi-touch system in which an operation is made with two fingers is becoming mainstream in recent years. In the time to come, further diversity will be required for touch panels, and in recent years, the request to obtain information of pressing force concurrently with positional information is increased. To be more specific, if two kinds of information regarding what position on the screen is touched by the operator with what strength can be detected, the operability will be further improved.

As an art regarding this, Japanese Patent Laying-Open No. 5-61592 (Patent Literature 1) discloses the technique of concurrently detecting positional information and pressing force information by overlapping a position detecting device and a pressure-sensitive sensor.

Japanese Patent Laying-Open No. 2006-163618 (Patent Literature 2) discloses a system of acquiring pressing force information using a piezoelectric sheet while acquiring positional information by detecting at what part the detected voltage appears in plural electrode wires formed in a grid form in the piezoelectric sheet.

However, in the touch panel described in Patent Literature 1, on the ordinary touch panel that detects only position, a pressure-sensitive sensor formed from a piezoelectric sheet or a pressure-sensitive resistor sheet is overlapped. This pressure-sensitive sensor covers the entire surface of the touch panel.

An ordinary touch panel is usually installed on some image display device, and is requested to have high transparency. Each of the position detecting touch panel and the pressure-sensitive sensor has a plurality of films and electrode layers. With this system, it is impossible to detect multi touches. Although the entirety can be made transparent by making the films transparent and using a transparent conductive material such as indium tin oxide (ITO) for the electrode layers, there is still a problem that the light transmittance is impaired because of the large number of stacked layers. Further, necessity of a large number of parts and processes leads a cost rise. Further, since the positional information and the pressing force information are separately detected, there is a problem that the signal processing is complicated.

On the other hand, in the touch panel described in Patent Literature 2, the piezoelectric sheet is formed with a micro-wired electrode in a grid form for the purpose of concurrently detecting positional information and pressing force information. Since the positional information is obtained based on from what electrode in the grid electrode the signal is strongly detected, it is necessary to connect all of these micro-wires to an operation processing unit, and there is a problem that the structure is considerably complicated.

Japanese Patent Laying-Open No. 2006-39667 (Patent Literature 3) describes the art that enables multi-touch in a resistant film-type touch panel.

In any of those described in Patent Literatures 1 to 3, a transparent electrode of ITO or the like is used. ITO contains indium which is rare metal, and is susceptible to price increase due to depletion. Although transparent electrodes made of materials other than ITO are known, it requires a lot of work for providing the entire resin film with an electrode, and some deterioration in transparency is caused because transmittance is not 100% even with a transparent electrode.

Generally, with a mere resistant film type touch panel, not only multi-touch cannot be detected, but also pressing force cannot be detected. It also has such a problem that a transparent electrode of wide area should be used.

Generally, with a mere electrostatic type touch panel, although multi-touch is enabled, a touch with a pen cannot be applied and pressing force cannot be detected. Further, it has a problem that a transparent electrode of wide area should be used.

PTL 1: Japanese Patent Laying-Open No. 5-61592
PTL 2: Japanese Patent Laying-Open No. 2006-163618
PTL 3: Japanese Patent Laying-Open No. 2006-39667

SUMMARY OF THE INVENTION

In light of the above, it is an object of the present invention to provide a touch panel capable of solving the aforementioned problem, capable of detecting both a pen and a finger, capable of corresponding to multi-touch, and capable of detecting pressing force, and reducing the use amount of a transparent electrode as much as possible, and a touch-type input apparatus containing the same, and a method for controlling the same.

The present invention is first directed to a touch panel including a piezoelectric sheet formed of poly-L-lactic acid having a stretching axis oriented in a predetermined direction; and first and second electrodes that are opposed to each other, formed on first and second main surfaces opposed to each other of the piezoelectric sheet, and for solving the aforementioned technical problem, a plurality of sets of the first and second electrodes are formed so that they do not cover the entire surface of the piezoelectric sheet and they are distributed discretely in plural positions.

The present invention is also directed to a touch-type input apparatus including the aforementioned touch panel, adapted to calculate a position where a pressing operation is made and pressing force by comparing voltages generated in each set of the electrodes when the pressing operation is made on the touch panel.

The touch-type input apparatus according to the present invention further includes storage means for preliminary storing the voltages that are obtained through a step of setting grid matrix coordinates on an operation surface of the touch panel and a step of measuring voltages generated in each set of the electrodes in association with a pressing operation by predetermined weight application on each grid point of the grid matrix coordinates, as base voltages in the respective grid points.

Further, the touch-type input apparatus according to the present invention includes:

means for determining an actual measured voltage generated in each set of the electrodes in association with a pressing operation made on the operation surface of the touch panel by an operator;

means for calculating a ratio of the measured voltage relative to the base voltage for each set of the electrodes for each of the grid points;

means for determining an average of the ratio for each set of the electrodes for each of the grid points;

means for determining a standard deviation of the ratio for each of the grid points;

means for ranking the grid points in ascending order of the standard deviation;

means for selecting predetermined top n grid points in the ranked grid points;

means for determining a coordinate (X, Y) of a pressing position at which a pressing operation is made by an operator as $$X=\Sigma(Xk/Sk)/\Sigma(1/Sk),\ Y=\Sigma(Yk/Sk)/\Sigma(1/Sk)$$

when the coordinate of the selected grid point is represented by (Xk, Yk) (k=1, 2, . . . , n), and the standard deviation is represented by Sk (k=1, 2, . . . , n); and means for determining pressing force of a pressing operation made by an operator by multiplying the applied weight by the ratio of the top grid point in the ranking.

The present invention is also directed to a method for controlling a touch-type input apparatus including the aforementioned touch panel, adapted to calculate a position where a pressing operation is made and pressing force by comparing voltages generated in each set of the electrodes when the pressing operation is made on the touch panel. The method for controlling a touch-type input apparatus according to the present invention first includes:

a first preliminary step of setting grid matrix coordinates on an operation surface of the touch panel;

a second preliminary step of measuring voltages generated in each set of the electrodes in association with a pressing operation by predetermined weight application on each grid point of the grid matrix coordinates; and a third preliminary step of storing the voltages obtained by the second preliminary step in a memory as base voltages in the respective grid points.

Further, in an actual use, the method includes:

a first practical step of determining an actual measured voltage generated in each set of the electrodes in association with a pressing operation made on the operation surface of the touch panel by an operator;

a second practical step of calculating a ratio of the measured voltage relative to the base voltage for each set of the electrodes for each of the grid points;

a third practical step of determining an average of the ratio for each set of the electrodes for each of the grid points;

a fourth practical step of determining a standard deviation of the ratio for each of the grid points;

a fifth practical step of ranking the grid points in ascending order of the standard deviation;

a sixth practical step of selecting predetermined top n grid points in the ranked grid points;

a seventh practical step of determining a coordinate (X, Y) of a pressing position at which a pressing operation is made by an operator as $$X=\Sigma(Xk/Sk)/\Sigma(1/Sk),\ Y=\Sigma(Yk/Sk)/\Sigma(1/Sk)$$

when the coordinate of the selected grid point is represented by (Xk, Yk) (k=1, 2, . . . , n), and the standard deviation is represented by Sk (k=1, 2, . . . , n); and an eighth practical step of determining pressing force of a pressing operation made by an operator by multiplying the applied weight by the ratio of the top grid point in the ranking.

In the aforementioned second preliminary step and first practical step, a voltage generated in each electrode may be detected at the time of operation in a pressing direction (the direction approaching the operation surface) or at the time of operation in a reverse pressing direction (the direction leaving from the operation surface) in pressing operation made on the operation surface of the touch panel.

According to the touch panel of the present invention, it is possible to detect an operation made with a pen or a finger, and to correspond to multi-touch, and further to detect pressing force. Since the electrode is not formed to cover the entire surface of the piezoelectric sheet, it is not necessary to use a large amount of material for a costly transparent electrode. Further, since electrodes are discretely formed so that they are distributed in plural positions, it is possible to improve the light transmissivity of the touch panel by devising the positions of the electrodes.

For example, since an electrode situated in an outer circumferential part of the piezoelectric sheet is not particularly necessary to have transparency, metal such as aluminum, copper, gold or nickel that is inexpensive compared with a transparent electrode material may be used as an electrode material. In other words, only for the electrode formed at the position blocking the sight toward the display surface, the one based on indium tin oxide, indium oxide•zinc oxide, zinc oxide or polythiophene, which is a transparent electrode material may be used as needed.

In the touch panel according to the present invention, when the piezoelectric sheet is brought into the condition that tension is imparted in a direction not coincident with the direction of stretching axis, the detection sensitivity, particularly the detection sensitivity for multi-touch can be drastically improved.

In the foregoing case, when the piezoelectric sheet is bonded together with the surface protection film with a curable adhesive in a region extending in a direction not coincident with the stretching axis, and is bonded together with the surface protection film with a non-curable adhesive in the remaining region, it is possible to impart tension easily and stably in a predetermined direction of the piezoelectric sheet.

According to the touch-type input apparatus of the present invention and the method for controlling the same, even when the number of electrodes distributed on the piezoelectric sheet is relatively small, it is possible to acquire positional information for discrete positions, namely any position in the entire surface based on discrete base data such as base voltages that are preliminary determined, and to concurrently detect pressing force.

In the second preliminary step and the first practical step in the method for controlling a touch-type input apparatus according to the present invention, by determining whether the voltage generated in each set of the electrodes is detected at the time of operation in a pressing direction or at the time of operation in a reverse pressing direction in pressing operation made on the operation surface of the touch panel, based on polarity of the voltage having the largest absolute value among voltages generated in each set of the electrodes, it is possible to make determination more reliably.

By not using the base voltage in the electrode showing a voltage value smaller than a predetermined threshold among the base voltages, in the second practical step in the method for controlling a touch-type input apparatus according to the present invention, it is possible to increase the reliability of processing, and to reduce the load on the processing capacity.

BRIEF DESCRIPTION OF THE DRAWINGS

FIG. 1(A) is a plan view and FIG. 1(B) is a section view along the line B-B in FIG. 1(A).

FIG. 3(A) represents pressed points, and FIG. 3(B) represents the voltages generated in correspondence with the points shown in FIG. 3(B).

FIG. 6(A) is a plan view, and FIG. 6(B) is a section view along the line B-B in FIG. 6(A).

FIG. 14 is a chart showing ratios of generated voltages when two points are concurrently touched in touch panel 1 shown in FIG. 1.

FIG. 15 is a chart corresponding to FIG. 1(A), showing the positions that are pressed for obtaining the generated voltages shown in FIG. 14.

FIGS. 16(A) and 16(B) show a touch panel 1e according to the fifth embodiment of the present invention, and FIG. 16(A) is a plan view, and FIG. 16(B) is a transverse section view of the center of the plan view.

DETAILED DESCRIPTION OF THE PREFERRED EMBODIMENTS

Figure 1A:
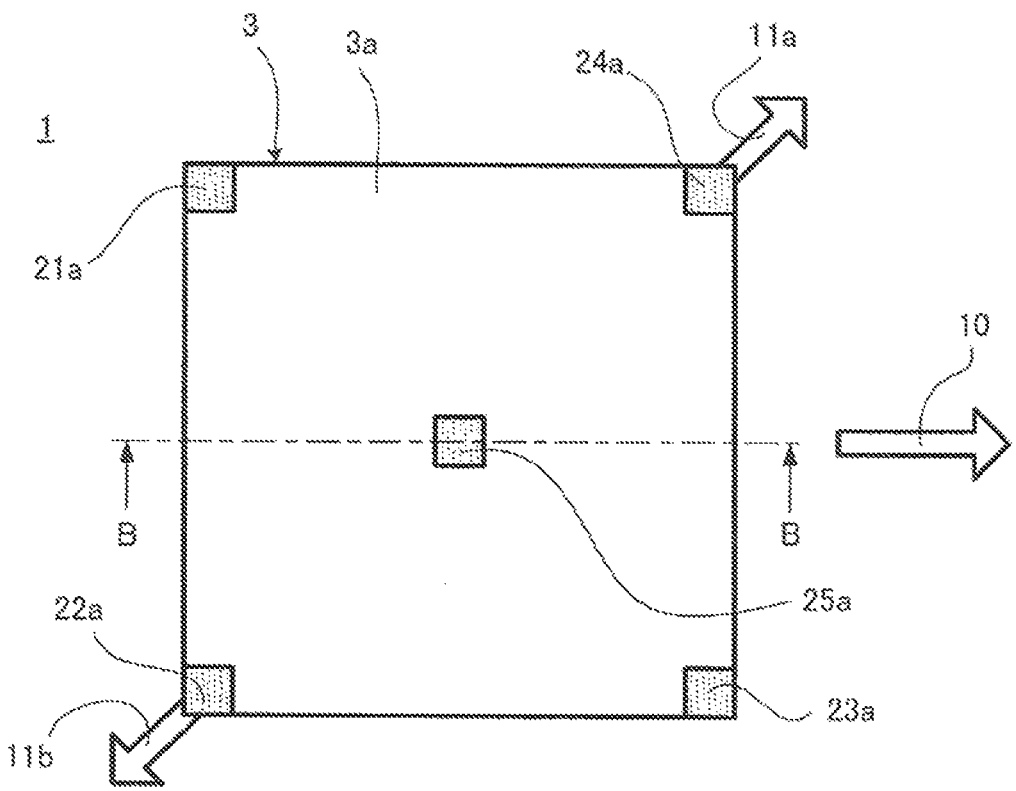
FIGS. 1(A) and 1(B) show a touch panel 1 contained in a touch-type input apparatus according to the first embodiment of the present invention.
Figure 1B:
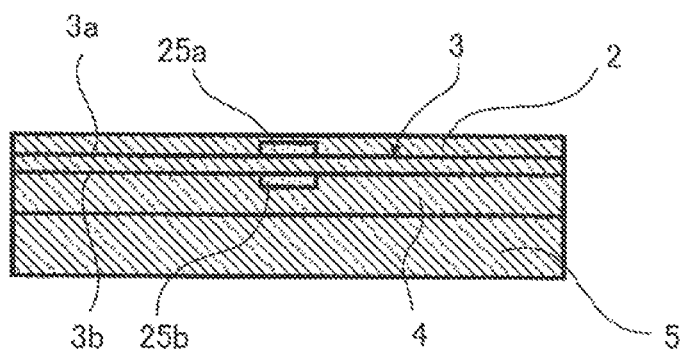

FIGS. 1(A) and 1(B) show a touch panel 1 according to the first embodiment of the present invention, and FIG. 1(A) is a plan view and FIG. 1(B) is a section view along the line B-B in FIG. 1(A).

As shown in FIG. 1(B), touch panel 1 has such a sectional structure that a surface protection film 2, a piezoelectric sheet 3 having piezoelectricity, a rubber elastic body 4, and base body 5 are stacked in this order. More specifically, piezoelectric sheet 3 is bonded together with surface protection film 2, and rubber elastic body 4 is disposed between surface protection film 2 and base body 5. Rubber elastic body 4 permits deformation of piezoelectric sheet 3, and is formed from an elastomer or a gel material, however, the gap between piezoelectric sheet 3 and base body 5 may be left as a space.

Typically, touch panel 1 is arranged on the surface of a flat panel display (FPD) such as a liquid crystal display, organic EL display, plasma display, or electronic paper. Therefore, each element constituting touch panel 1 is preferably formed from a material having transparency. In this case, base body 5 described above may be formed from FPD. In the following, description will be made on the assumption that base body 5 is formed from FPD.

Surface protection film 2 constitutes an operation surface on which a pressing operation by an operator is to be made, and is formed from, for example, a film made of polyethylene terephthalate, polyethylene naphthalate, polycarbonate or poly propylene, or a glass plate. Although omitted in the drawing, surface protection film 2 may be formed on its surface with an antireflection film or a scratch-resistant or antifouling hardcoat layer, or a composite layer thereof. FIG. 1(A) is illustrated in such a condition that surface protection film 2 is removed.

Piezoelectric sheet 3 is formed of a uniaxially stretched poly-L-lactic acid (PLLA). In FIG. 1(A), a stretching axial direction of PLLA is represented by an arrow 10. PLLA has the advantage of being highly transparent.

On a first main surface 3a of piezoelectric sheet 3, first electrodes 21a to 25a are formed, and on a second main surface 3b that is opposed to first main surface 3a of piezoelectric sheet 3, second electrodes 21b to 25b are formed so that they are opposed to corresponding ones of first electrodes 21a to 25a with piezoelectric sheet 3 interposed therebetween. As to second electrodes 21b to 25b, only electrode 25b is shown in FIG. 1(B).

In a section view of FIG. 1(B), the thickness of each element is exaggeratingly shown. Actually, the thickness of piezoelectric sheet 3 is about 50 to 100 μm. Of course, the thickness may be larger than or less than this range considering the entire size of piezoelectric sheet 3 and the piezoelectric characteristic itself of piezoelectric sheet 3. Thickness of any element is a design item to be determined depending on the entire design.

Piezoelectric sheet 3 is fixed to a strong frame body (not illustrated) while it is constrained in the directions of arrows 11a and 11b. As a result, piezoelectric sheet 3 is in such a condition that tension is imparted in the directions of arrows 11a and 11b.

Figure 2:
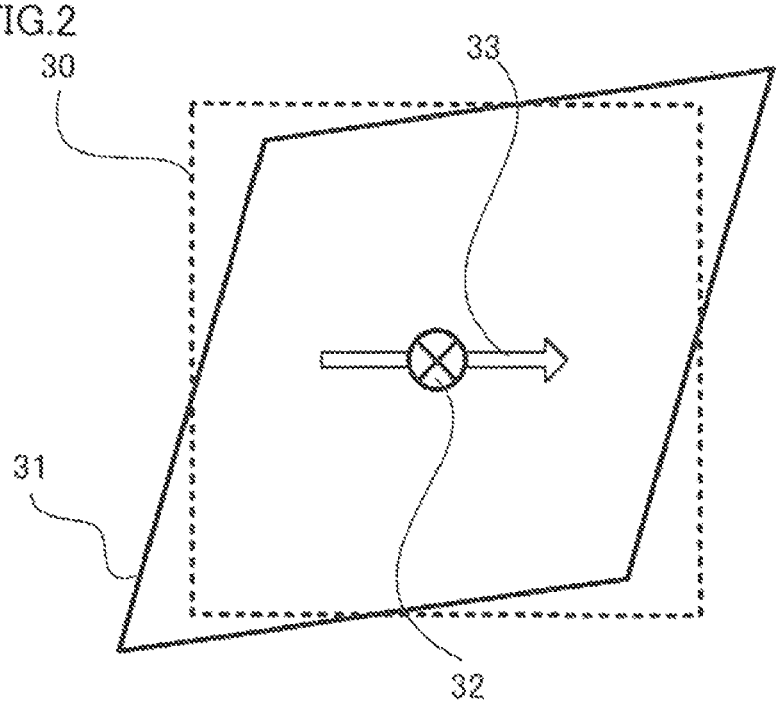
FIG. 2 is a view for illustrating piezoelectricity of PLLA.

FIG. 2 is a view for illustrating piezoelectricity of PLLA. When an electric field in the direction represented by a symbol 32 is applied to a piezoelectric sheet 30 formed of PLLA in a square shape, deformation into a substantially rhomboidal shape as shown in a solid line 31 occurs. In FIG. 2, the deformation is shown quite exaggeratingly.

In FIG. 2, an arrow 33 represents a stretching axial direction of PLLA. Such deformation is deformation derived from piezoelectric constant $d_{14}$ of PLLA. Briefly, piezoelectric sheet 30 elongates along the axis in the direction that forms approximately 45 degrees with stretching axial direction 33 (direction of diagonal line), and contracts along the axis oriented in the direction of 90 degrees from the former direction. This is a piezoelectric reverse effect. In reverse, when deformation as represented by a solid line 31 is caused to occur by external force, an electric field in the direction represented by symbol 32 occurs, and when electrodes are formed on both main surfaces of piezoelectric sheet 30, voltages are generated in these electrodes. This is a piezoelectric effect. This reveals that the case that causes such rhombic deformation realizes the piezoelectric effect most efficiently.

Again returning to FIGS. 1(A) and 1(B), in touch panel 1, since piezoelectric sheet 3 is constrained in the directions of arrows 11a and 11b, for example, when a center part of piezoelectric sheet 3 is pressed to deform, deformation as represented by solid line 31 in FIG. 2 occurs in piezoelectric sheet 3.

Figure 3A:
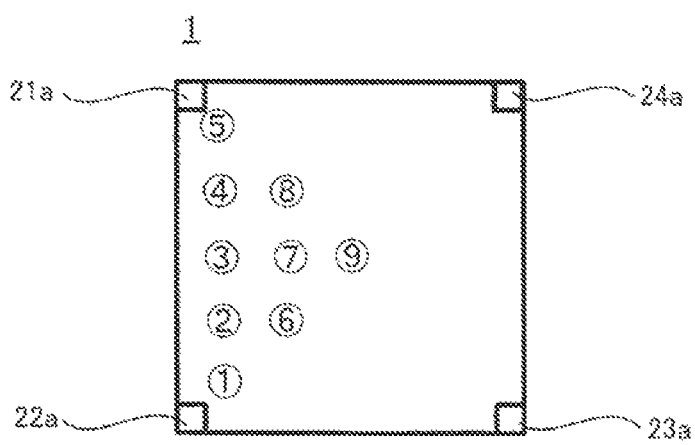
FIGS. 3(A) and 3(B) are views comparatively showing voltages generated between each of electrodes 21a to 24a and each of electrodes 21b to 24b when a predetermined point in touch panel 1 shown in FIGS. 1(A) and 1(B) is pressed.
Figure 3B:
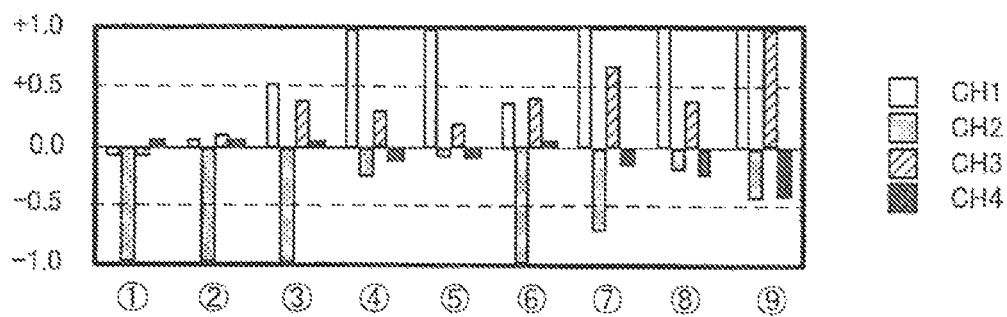

FIGS. 3(A) and 3(B) are views comparatively showing voltages generated between each of electrodes 21a to 24a and corresponding electrodes 21b to 24b when a predetermined point in touch panel 1 is pressed. That is, the graph of FIG. 3(B) shows voltage occurring at channel 1 (CH1) between electrodes 21a and 21b, voltage occurring at channel 2 (CH2) between electrodes 22a and 22b, voltage occurring at channel 3 (CH3) between electrodes 23a and 23b, and voltage occurring at channel 4 (CH4) between electrodes 24a and 24b when predetermined positions <1>, <2>, . . . , <9> in touch panel 1 shown in FIG. 3(A) are pressed. Here, center electrodes 25a and 25b are not used.

As shown in FIG. 3(B), the generation pattern of voltage is diverse, and it is revealed that a planar position on touch panel 1 can be recognized by recognizing this pattern.

Here, if piezoelectric sheet 3 is made larger than base body 5, and electrodes 21a to 24a situated in the outer circumferential part are covered with a frame (not illustrated), there will be no electrode except for electrode 25a on the image displayed in base body 5. Therefore, it is not necessary to form a transparent electrode unless electrode 25a is formed. That is, electrodes 21a to 24a and electrodes 21b to 24b can be formed by vapor deposition, sputtering or plating of aluminum, copper, silver, gold and so on, and touch panel 1 can be provided at a low price.

Electrodes 25a and 25b situated in the center are not necessary. However, by forming these electrodes 25a and 25b from a transparent electrode material based on one kind selected from the group consisting of indium tin oxide, indium oxide•zinc oxide, zinc oxide and polythiophene, and arranging them in the center of piezoelectric sheet 3, the voltage generation pattern is further diverse, and the detection resolution can be further increased.

As described above, when the mechanism that results in deformation similar to deformation according to the piezoelectric reverse effect of PLLA is employed, diverse voltages can be taken out at highest efficiency. That is, the embodiment described above is the best mode.

As shown in FIG. 1(A), when it is difficult to apply tension only in the directions of arrows 11a and 11b, the result similar to that of the best mode can be obtained by applying tension to the entire piezoelectric sheet 3 and applying stronger tension only in the directions of arrows 11a and 11b.

Figure 4:
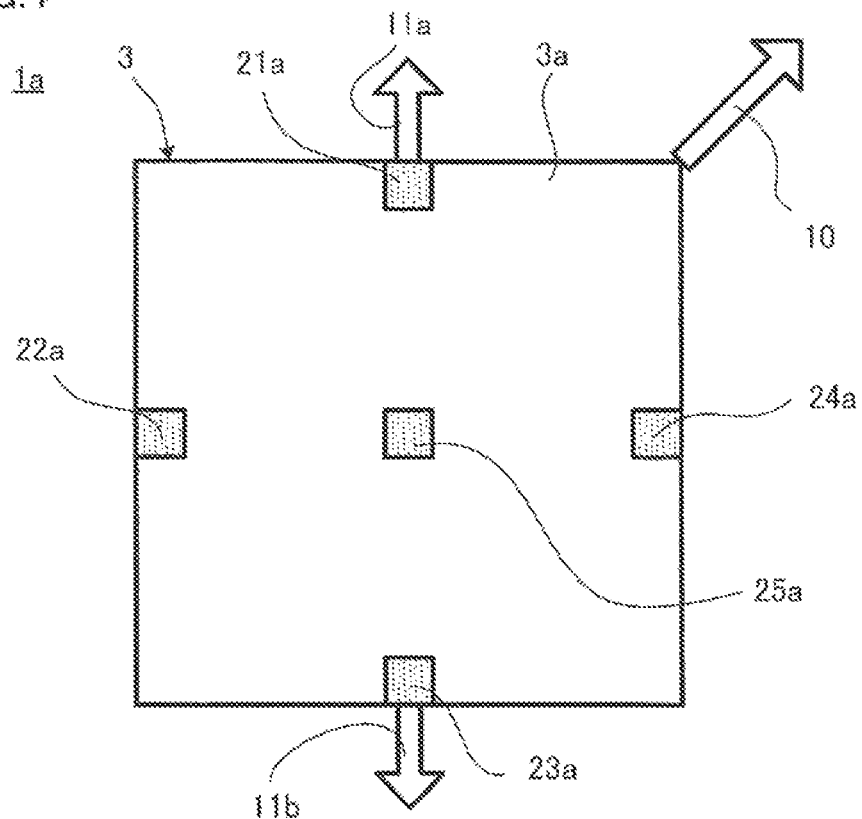
FIG. 4 is a view corresponding to FIG. 1(A), showing a touch panel 1a according to the second embodiment of the present invention.

FIG. 4 is a view corresponding to FIG. 1(A) showing a touch panel 1a according to the second embodiment of the present invention. In FIG. 4, the element corresponding to the element shown in FIG. 1(A) is denoted by the same reference numeral, and overlapping description will be omitted. FIG. 4 shows a preferred electrode arrangement and preferred examples of tension directions 11a and 11b when stretching axial direction 10 is at diagonally 45 degrees.

Figure 11:
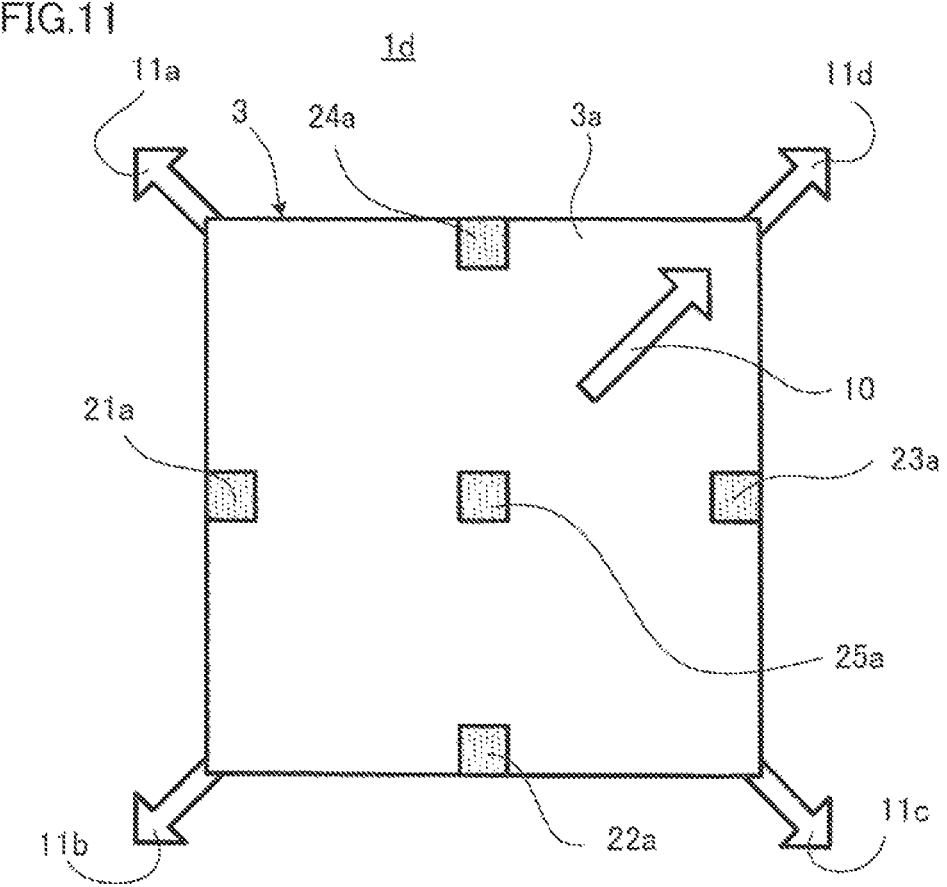
FIG. 11 is a view corresponding to FIG. 1(A), showing a touch panel 1d having an unsatisfactory configuration regarding multi-touch correspondence, which is a comparative example of the present invention.

For example, when four corners of piezoelectric sheet 3 are stretched under the equivalent tension and fixed, the voltage patterns from electrodes 21a to 24a resemble even for different positions where a pressing operation is made, making it difficult to detect the position (see FIG. 11). On the contrary, under tension directions 11a and 11b as shown in FIG. 4, it is possible to obtain diverse voltage generation patterns as shown in FIG. 3(B) as is the case with the embodiment shown in FIGS. 1(A) and 1(B), and to detect the position made more correctly by arranging respective sides of electrodes 21a to 24a at approximately the center of each side.

In FIG. 1(A) and FIG. 4, electrodes 21a to 24a are arranged in the same size at symmetric positions, however, the position and the size are not particularly limited. As to the size of electrodes 21a to 24a, it may be any size insofar as sufficient voltage is obtained by an amplifier used for amplifying voltages from electrodes 21a to 24a. The magnitude of voltage of each electrode may be intentionally made different, and thereby the magnitude of the generated voltage may be controlled.

The number of electrodes 21a to 24a formed in the outer circumferential part is not necessarily four, and it may be, for example, three, or may be increased to six or nine. In the case where a certain threshold is predetermined, and voltages lower than the predetermined threshold are not used, pattern recognition cannot be achieved if the number of electrodes is small, however, such a case can be cleared if a sufficient number of electrodes are provided. By setting positions of electrodes asymmetrically or setting sizes of electrodes asymmetrically, the voltage generation patterns as shown in FIG. 3(B) are less likely to be symmetric, and judgment is further facilitated.

Likewise, as to electrode 25a situated in the center, the number is arbitrary, and electrode 25a may not be provided.

Figure 5:
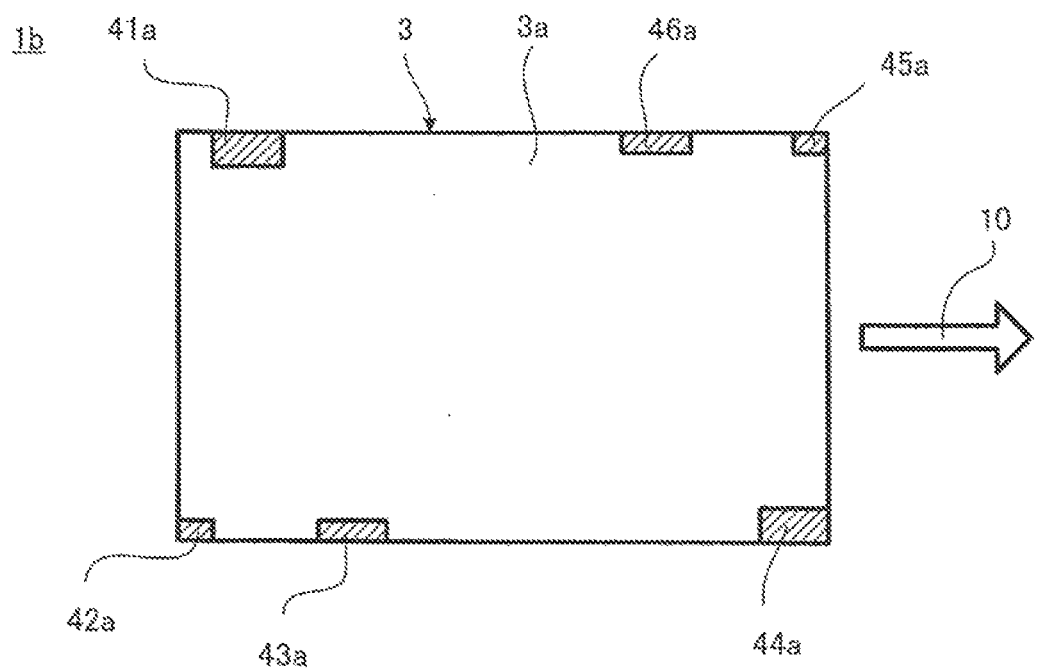
FIG. 5 is a view corresponding to FIG. 1(A), showing a touch panel 1b according to the third embodiment of the present invention.

FIG. 5 is a view corresponding to FIG. 1(A), showing a touch panel 1b according to the third embodiment of the present invention. In FIG. 5, the element corresponding to the element shown in FIG. 1(A) is denoted by the same reference numeral, and overlapping description will be omitted.

FIG. 5 shows a modified example of the electrode configuration. More specifically, first electrodes 41a to 46a are provided on first main surface 3a of piezoelectric sheet 3, and electrodes 41a to 46a are designed to have different sizes, and the positions do not follow a regular rule. Although not illustrated, this also applies to second electrodes that are formed on the second main surface of piezoelectric sheet 3, so that they are opposed to first electrodes 41a to 46a.

While the tension direction is not illustrated, as the point to which tension is imparted, the part where electrode 42a and electrode 45a are situated, or the part where electrode 43a and electrode 46a are situated is conceivable. Of course, a similar effect can be obtained for other points than this. The tension is imparted most preferably in the direction that forms approximately 45 degrees with stretching axial direction 10, but may be applied in other direction, and for the rectangular shape as is piezoelectric sheet 3 shown in FIG. 5, tension is applied desirably in either one direction coinciding with the diagonal line direction.

Also the cutting direction of the film which is a material for piezoelectric sheet 3 may be varied so that the diagonal line direction forms 45 degrees with the stretching axial direction. In other words, the stretching axial direction is made different from stretching axial direction 10 shown in the drawing.

It is anyway desired to make the tension direction not completely coincident with stretching axial direction 10.

The shape of the electrode is not limited to a rectangle and may have any shape.

Some of the plural electrodes may be connected in series. This will be concretely described below.

Figure 6A:
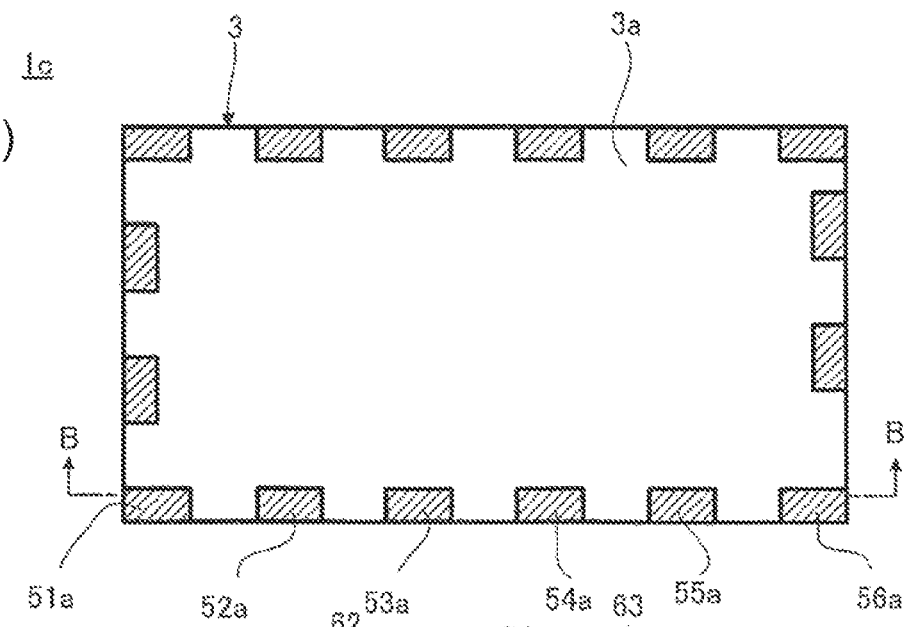
FIGS. 6(A) and 6(B) show a piezoelectric sheet 3 contained in a touch panel 1c according to the fourth embodiment of the present invention.
Figure 6B:
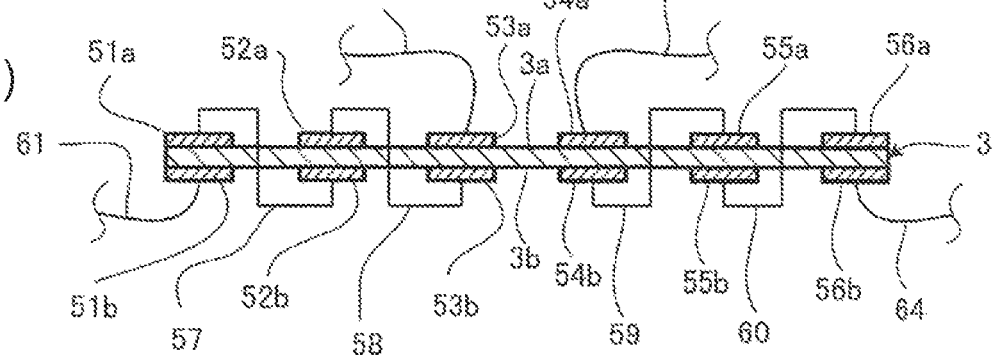

FIGS. 6(A) and 6(B) show piezoelectric sheet 3 contained in a touch panel 1c according to the fourth embodiment of the present invention, and FIG. 6(A) is a plan view, and FIG. 6(B) is a section view along the line B-B of FIG. 6(A). In FIG. 5, the element corresponding to the element shown in FIGS. 1(A) and 1(B) is denoted by the same reference numeral, and overlapping description will be omitted.

In FIGS. 6(A) and 6(B), a plurality of electrodes are formed along the outer circumferential part of piezoelectric sheet 3, and part of these electrodes are connected in series. To be more specific, as shown in FIG. 6(B), a first electrode 51a and a second electrode 52b are mutually connected by a connecting line 57, and a first electrode 52a and a second electrode 53b are mutually connected by a connecting line 58, and thereby the electrodes from an electrode 51b to an electrode 53a are serially connected. Also, a second electrode 54b and a first electrode 55a are mutually connected by a connecting line 59, and a second electrode 55b and a first electrode 56a are mutually connected by connecting line 60, and thereby electrodes from an electrode 54a to an electrode 56b are serially connected.

Connecting lines 61 and 62 respectively connected to second electrode 51b and first electrode 53a, and connecting lines 63 and 64 respectively connected to first electrode 54a and second electrode 56b are connected to an amplifier (not illustrated). By serially connecting electrode pairs that generate the same potential as described above, it is possible to increase the detection voltage, and to further reduce the error with respect to noise.

Next, a method for detecting the position and the pressing force based on the voltage generated by a pressing operation will be described.

Figure 7:
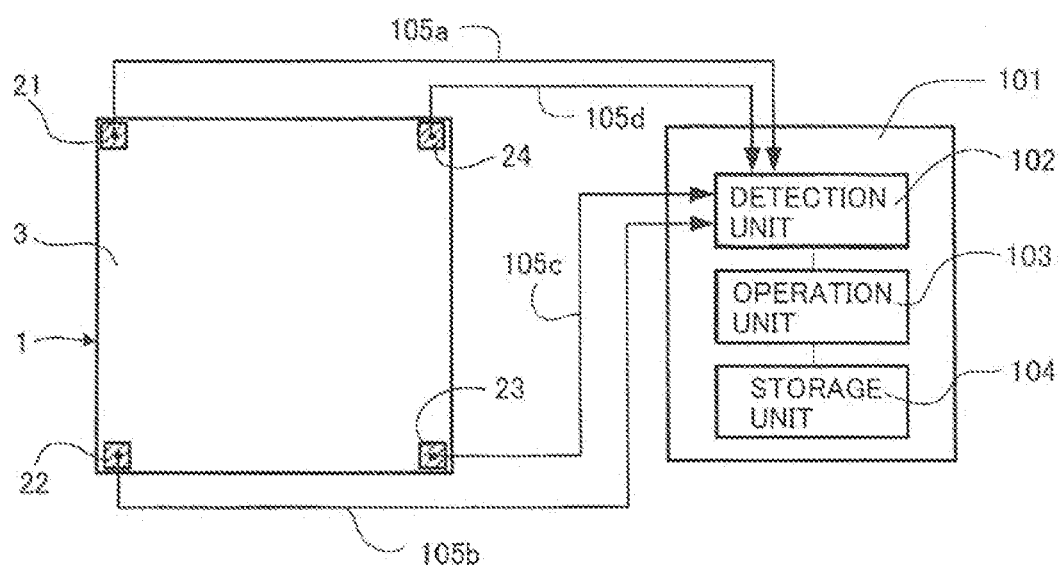
FIG. 7 is a block diagram showing circuitry of a touch-type input apparatus 100 having touch panel 1 shown in FIGS. 1(A) and 1(B).

FIG. 7 is a block diagram showing circuitry of a touch-type input apparatus 100 including touch panel 1 shown in FIGS. 1(A) and 1(B). Touch-type input apparatus 100 has touch panel 1 and a processor 101, and processor 101 has a detection unit 102, an operation unit 103 and a storage unit 104. In the description with reference to FIG. 7, since it is not necessary to distinguish between first electrodes 21a to 24a and second electrodes 21b to 24b included in touch panel 1, these are collectively called "electrode 21" to "electrode 24", and the reference numerals "21" to "24" are used in FIG. 7.

Referring to FIG. 7, voltage generated in each of electrodes 21 to 24 is fed to detection unit 102 respectively through connecting lines 105a to 105d where the voltage is amplified. The amplified voltage is analyzed in operation unit 103, and the position and the pressing force are determined. Storage unit 104 stores base voltages that are preliminarily acquired.

First, a preliminary process to be conducted prior to actual use of touch-type input apparatus 100 will be described.

Figure 8:
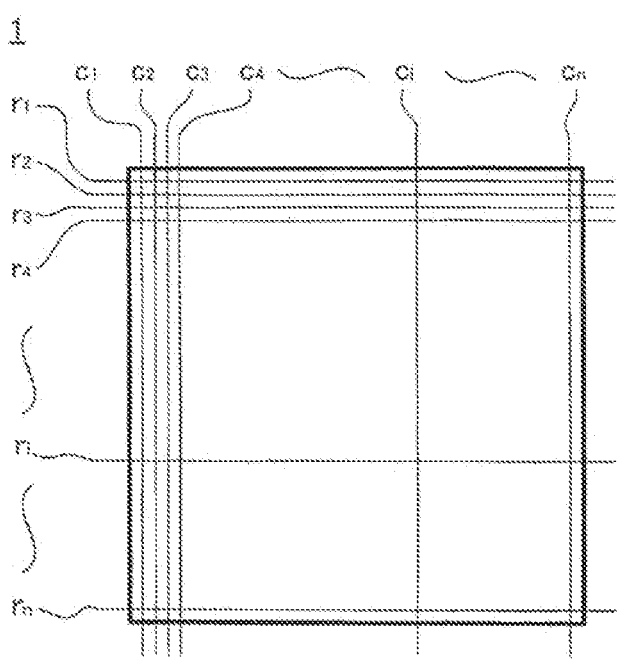
FIG. 8 is a view for illustrating grid matrix coordinates set for an operation surface of touch panel 1.

First, as a first preliminary step, as shown in FIG. 8, grid matrix coordinates are set for the operation surface of touch panel 1. In FIG. 8, depiction of electrodes 21 to 24 is omitted. The following description will be made on the assumption that electrodes 25a and 25b situated in the center do not exist. A grid point on the matrix coordinates is an imaginary point, and is not depicted, for example, on the operation surface. The number of grid points, namely, the number of partitions by the vertical axis and the horizontal axis is arbitrary. Fine partitioning improves the resolution, but complicates the preliminary process and the subsequent operation processing.

The present invention provides a method capable of accurately detecting the position even when the grid points are taken somewhat roughly. The grid points should be set at an interval of about 10 to 100 times the resolution that is eventually required. For example, when the required resolution is 0.2 mm, the grid points may be set at an interval of about 2 to 20 mm. Selection of 10 times or 100 times the required resolution depends on the detection sensitivity of piezoelectric sheet 3. This is the design item because it depends on the thickness, piezoelectric constant and uniformity of piezoelectric sheet 3, and the material used for surface protection film 2.

Next, as a second preliminary step, predetermined pressing force is applied on every grid point, and the voltage generated at each of electrodes 21 to 24 is measured.

In a piezoelectric body, since voltage is generated both at the time of operation in a pressing direction (the direction toward the operation surface) and at the time of operation in a reverse pressing direction (the direction leaving from the operation surface) in pressing operation, it is desired to acquire the voltages of both of these. Actually, measurement is conducted automatically using a robot and an automated measuring device in cooperation with the robot. It is desired to measure a plurality of times and average the measurements, or to conduct least-square approximation using data for a large number of points.

Next, as a third preliminary step, the voltage obtained by the aforementioned second preliminary step is stored in storage unit 104 as a base voltage at each grid point together with the coordinate value of the grid point.

When n lines are set for each of the vertical direction and the horizontal direction, the number of grid points is n×n. It is not necessarily to make the number of division in the vertical direction be equivalent to the number of division in the horizontal direction. Further, not every division should be made at regular intervals, and the grid intervals may be made different between the area where the requirement of resolution is high and the area where the requirement of resolution is low.

In particular, when surface protection film 2 is formed from a glass plate, the mechanical change is larger when the center region is pressed than when the peripheral region is pressed. Therefore, "well-varied" voltages are detected near the center, and noise is likely to occur in the peripheral part. In association with this, the number of division in the peripheral part is sometimes increased.

These are preliminary steps that should be conducted in advance before touch-type input apparatus 100 is actually used. Next, practical steps to be executed at the time of actual use will be described.

Figure 9:
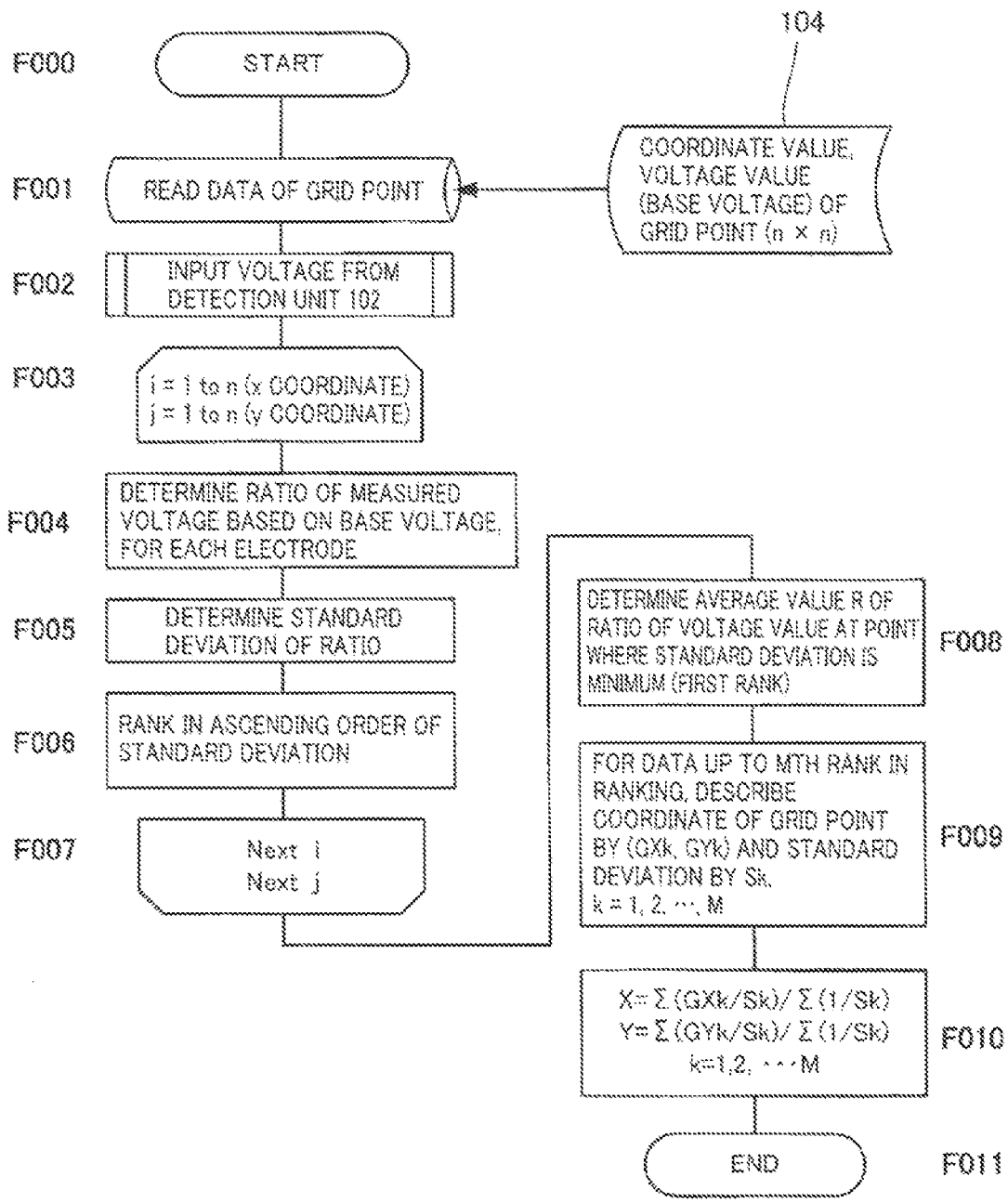
FIG. 9 is a flow chart showing a coordinate detection algorism executed by an operation unit 103 shown in FIG. 7.

At the time of actual use, a grid point is not necessarily touched. The way of determining the coordinate at this time will be described. FIG. 9 shows a coordinate detection algorism to be executed by operation unit 103. Referring to FIG. 9, each flow will be described.

F000:

Here, the program starts.

Detection unit 102 may pull the trigger upon generation of voltage in touch panel 1 to start the program, or execution may be constantly repeated at a regular interval.

F001:

Operation unit 103 reads from storage unit 104 a coordinate of each grid point and voltages respectively generated in electrodes 21 to 24 at the time of a reference pressing at the point.

This process is not necessarily conducted every time pressing occurs on touch panel 1, and does not need to be executed once the data has been downloaded onto CPU.

F002:

Measured voltages (voltage values from electrodes 21 to 24) are read from detection unit 102.

To detection unit 102, data about actual measured voltages generated in each of electrodes 21 to 24 is sent in association with a pressing operation made by an operator on the operation surface of touch panel 1.

F003:

This step is the upper end of repetitive processing.

For every grid point, the repetitive processing is executed.

F004:

A ratio of a measured voltage to a base voltage is determined for each of electrodes 21 to 24.

One example will be shown below. The example where a measured voltage and a base voltage are compared at three grid points A, B and C is considered.

TABLE 1

Grid point A

| Electrode | Measured voltage | Base voltage | Ratio |
|---|---|---|---|
| 21 | 45 | 25 | 1.80 |
| 22 | −80 | −42 | 1.90 |
| 23 | 78 | 36 | 2.17 |
| 24 | 37 | 18 | 2.06 |
|  |  | Standard deviation → | 0.16 |

TABLE 2

Grid point B

| Electrode | Measured voltage | Base voltage | Ratio |
|---|---|---|---|
| 21 | 45 | 21 | 2.14 |
| 22 | −80 | −40 | 2.00 |
| 23 | 78 | 41 | 1.90 |
| 24 | 37 | 19 | 1.95 |
|  |  | Standard deviation → | 0.10 |

TABLE 3

Grid point C

| Electrode | Measured voltage | Base voltage | Ratio |
|---|---|---|---|
| 21 | 45 | 60 | .75 |
| 22 | −80 | −5 | 4.15 |
| 23 | 78 | 18 | 4.33 |
| 24 | 37 | 75 | 0.49 |
|  |  | Standard deviation → | 1.76 |

At grid point A and grid point B shown in Table 1 and Table 2, when the measured voltage and the base voltage are compared, a ratio of nearly twice is observed in any electrode. On the other hand, at grid point C shown in Table 3, the ratio of the measured voltage to the base voltage is various.

These Table 1 and Table 3 reveal that grid point C is far from the actually pressed point, and that a point near grid point A and grid point B is pressed. Here, the measurement error or the like is ignored.

The ratio is determined on the assumption that signs of these coincide with each other. When signs of these do not coincide with each other, the grid point is recognized as being situated at a completely different position, or far apart from the pressing point, and calculation of ratio will not be conducted.

When the base voltage or the measured voltage of a certain electrode is near 0, there is a possibility that these have reverse signs. For addressing this, a threshold is preliminarily set, and when the base voltage of a certain electrode is lower than the threshold, the data of that electrode will not be used in the subsequent processing.

For example, in the next step, standard deviation is typically calculated for four points, however, when there is a base voltage lower than the threshold as described above, the calculation will be conducted using three points excluding the point that exhibits this base voltage. With such a measure, it is possible to prevent the calculated ratio from being extremely large when the base voltage is near 0.

F005:

Standard deviation of ratios for each electrode is determined.

Examples of standard deviation are described in Table 1 to Table 3. As is apparent from Table 1 to Table 3, the smaller the variation in ratio, the closer to the grid point the pressing point is, and the standard deviation is small.

A standard deviation of 0 indicates that the pressing is made just on the grid point. Actually, the probability that the standard deviation is 0 is very small in consequence of an error, however, if it is 0, the subsequent coordinate determination processing may be interrupted and the coordinate of the grid point itself may be determined as the coordinate of the pressing point. In an actual program, a threshold of standard deviation is set, and when the standard deviation is smaller than the threshold, the subsequent coordinate determination processing is interrupted and the coordinate of the grid point itself is determined as the coordinate of the pressing point.

F006:

Ranking of the standard deviation obtained in the previous processing is conducted.

Owing to the respective processing, the ranking has been made in the previous series of operations. Therefore, the rank in the previously determined ranking of the currently determined standard deviation is calculated, and the ranks of the subsequent data are shifted down.

F007:

This step is the lower end of the repetitive processing.

F003 to F007 are repeated until calculations have completed for all grid points.

F008:

An average value of ratios of the grid point ranked in the top rank in the process of last F006 relative to the base voltage data is determined, and this is determined as a pressing force ratio.

For example, among grid points A to C shown in Table 1 to Table 3, when grid point B is determined as the first-rank point, the average of the ratios is calculated to be 1.998. Therefore, when the reference pressing force is set at 0.10 N, the actual pressing force is determined as about 0.20 N.

F009:

As shown in FIG. 9, numerical values are assigned to variables.

For making determination for the data up to the Mth rank in the ranking, the coordinate of grid point is represented by (GXk, GYk), and the standard deviation is represented by Sk, and k=1, 2, . . . , M. Practically M of 3 or 4 is adequate. The larger number will increase the amount of calculation, and will rather increase the error.

F010:

The calculation is made as shown in FIG. 9.

The coordinate (X, Y) to be determined can be determined by the following formulas:

$$X=\Sigma(GXk/Sk)/\Sigma(1/Sk) \quad (1), \text{ and}$$

$$Y=\Sigma(GYk/Sk)/\Sigma(1/Sk) \quad (2)$$

(wherein, k=1, 2, . . . , M).

Figure 10:
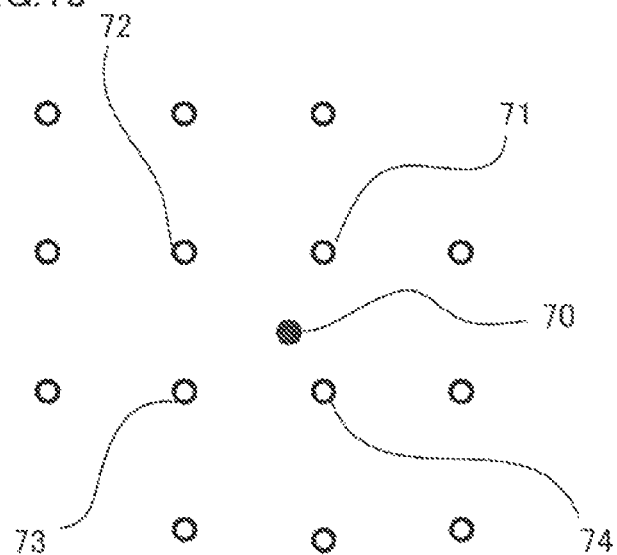
FIG. 10 is a view for illustrating the image of determining the coordinate of a pressing operation point executed by using the coordinate detection algorism shown in FIG. 9.

The image of determining the coordinate of a pressing operation point is as follows. FIG. 10 is a close-up around the higher-ranking grid points when M=4. In FIG. 10, grid points 71 to 74 are depicted in the vicinity of a pressing operation point 70. On touch panel 1, such rid points do not exist in visible form.

The ranking as described above gives the first rank to grid point 74, the second rank to grid point 71, the third rank to grid point 73, and the fourth rank to grid point 72. When respective coordinates of grid point 74 in first rank, grid point 71 in second rank, grid point 73 in third rank and grid point 72 in fourth rank are (−20, 5), (−20, 10), (−25, 5) and (−25, 10), and respective standard deviations are 0.05, 0.08, 0.13 and 0.18, the coordinate (X, Y) of pressing operation point 70 is calculated from the foregoing formulas (1) and (2) to be (X, Y)=(−21.45, 6.97).

In the above description, the method for processing data detected at the time of operation in the pressing direction in pressing operation has been described, voltage is generated also when a finger or a pen is left during pressuring, namely at the time of operation in the reverse pressing direction, and this voltage has reverse polarity to that at the time of operation in the pressing direction. Focusing on the electrode where the largest voltage is detected, the polarity of voltage detected in detection unit 102 is fixed. Therefore, by focusing on the polarity, it is possible to distinguish between the operation made in the pressing direction and the operation made in the reverse pressing direction.

In an operation in the reverse pressing direction, voltages of reverse polarity are generated in all electrodes in comparison with the voltages generated in a pressing operation. Therefore, by reading this polarity reversely, the data at the time of operation in the pressing direction can be directly used.

Further, by using the data obtained at the time of operation in the reverse pressing direction in the data acquiring step, it is possible to achieve the detection with the same algorism.

Of course, it is possible to detect the position and the pressing force based on the data when the operation is made in the pressing direction, while no process is conducted when the operation is made in the reverse pressing direction. Alternatively, the detections may be conducted only when the operation is made in the reverse pressing direction while no process is made when the operation is made in the pressing direction. Also, the method of detecting the position only when the operation is made in the pressing direction, and detecting the pressing force only when the operation is made in the reverse pressing direction, and vice versa are possible.

Also the method of conducting full detections regardless of the operation made in the pressing direction or in the reverse pressing direction, and using an average of these is possible. Also, the result at the time of in the pressing direction and the result at the time of operation in the reverse pressing direction may be grasped as separate results.

Further, since the detected voltage changes by changing the pressing speed or the releasing speed in conducting the pressing operation, the pressing operation can be made differentially in the manners of slowly pressing, quickly pressing, slowly releasing and quickly releasing, in application to a game machine or the like.

Next, multi-touch correspondence of the touch panel according to the present invention will be described.

FIG. 11 is a view corresponding to FIG. 1(A), showing touch panel 1d having a defective configuration for multi-touch correspondence, which is a comparative example of the present invention. In FIG. 11, the element corresponding to the element shown in FIG. 1(A) is denoted by the same reference numeral, and overlapping description will be omitted.

In touch panel 1d shown in FIG. 11, piezoelectric sheet 3 is fixed while tension is applied on its four corners as shown by four arrows 11a to 11d. Further, stretching axial direction 10 is coincident with the direction oriented from tension direction 11b to tension direction 11d, and electrodes 21a to 24a are arranged in a substantially symmetric positional relationship near respective centers of four sides of piezoelectric sheet 3.

Figure 12:
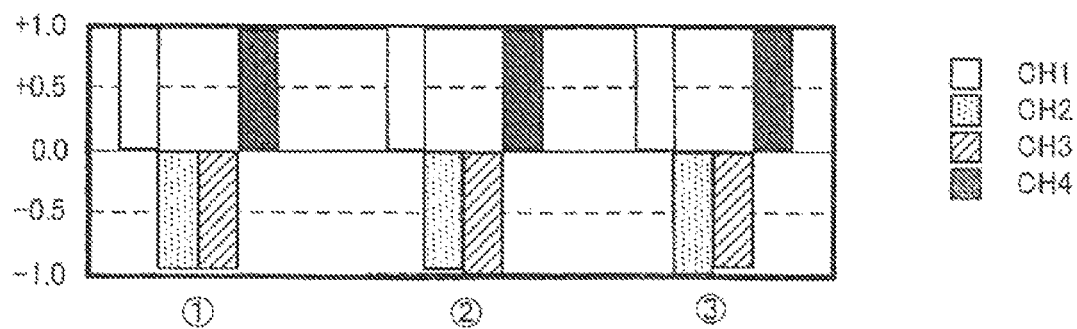
FIG. 12 is a chart showing ratios of generated voltages when two points along the diagonal line in touch panel 1d are concurrently touched in touch panel 1d shown in FIG. 11.

Voltages that are generated when two points along the diagonal line are concurrently touched (multi-touched) in such touch panel 1d are shown in the graph of FIG. 12. The graph shown in FIG. 12 is standardized based on the largest voltage as 1.

In FIG. 12, "CH1" represents the voltage generated at channel 1 between electrodes 21a and 21b, "CH2" represents the voltage generated at channel 2 between electrodes 22a and 22b, "CH3" represents the voltage generated at channel 3 between electrodes 23a and 23b, and "CH4" represents the voltage generated at channel 4 between electrodes 24a and 24b.

Figure 13:
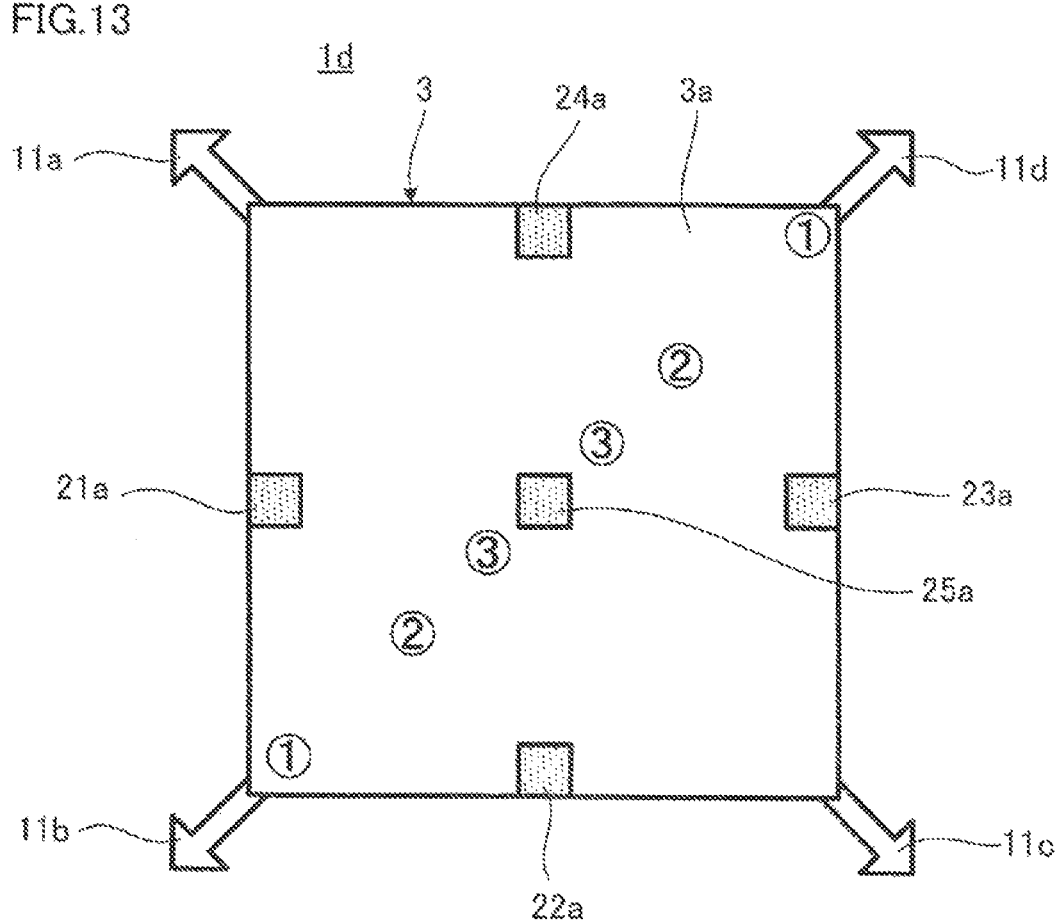
FIG. 13 is a chart corresponding to FIG. 11, showing the positions that are pressed for obtaining the generated voltages shown in FIG. 12.

‹1›, ‹2› and ‹3› surrounded by a circle in FIG. 12 represent the positions where a pressing operation is made, and respectively correspond to the positions ‹1›, ‹2› and ‹3› surrounded by a circle in FIG. 13. As can be seen from FIG. 13 where each of the positions represented by ‹1›, ‹2› and ‹3› is found at two positions, the voltages shown in FIG. 12 correspond to the voltages when the two positions of ‹1›, two positions of ‹2› and two positions of ‹3› in FIG. 13 are concurrently pressed.

As can be seen from FIG. 12, at any of the position of ‹1›, position of ‹2› and position of ‹3›, the ratio of voltage between CH1 to CH4 exhibits a substantially same pattern. This reveals that it is very difficult to separate the position of ‹1›, position of ‹2› and position of ‹3› from each other in multi-touch.

Also in the case of touching one center point, the voltage ratio would be similar to the above, and separation from one point touch is difficult. Therefore, even with center electrode 25a, it would be difficult to separate as described above.

In contrast to this, touch panel 1 as shown in FIGS. 1(A) and 1(B) which is the best mode as described above is configured, and voltages when center electrode 25a is actuated as well are shown in FIG. 14. In FIG. 14, "CH1" represents the voltage generated at channel 1 between electrodes 21a and 21b, "CH2" represents the voltage generated at channel 2 between electrodes 22a and 22b, "CH3" represents the voltage generated at channel 3 between electrodes 23a and 23b, "CH4" represents the voltage generated at channel 4 between electrodes 24a and 24b, and "CH5" represents the voltage generated at channel 4 between electrodes 25a and 25b.

FIG. 15 shows the positions where a press operation is made for obtaining the voltages shown in FIG. 14. Specifically, ‹1›, ‹2› ..., ‹9› surrounded by a circle in FIG. 14 represent the positions where a pressing operation is made, and respectively correspond to the positions ‹1›, ‹2› ..., ‹9› surrounded by a circle in FIG. 15. As can be seen from FIG. 15 where each of the positions represented by ‹1›, ‹2›, ..., ‹9› is found at two positions, the voltages shown in FIG. 14 correspond to the voltages when the two positions of ‹1› or the like in FIG. 15 are concurrently pressed.

As shown in FIG. 14, the ratio of voltage among CH1 to CH5 when two points are touched completely differs at each position of ‹1›, ‹2›, ..., ‹9›, demonstrating that position detection and pressing force detection can be conducted concurrently. This leads the presumption that the variation further increases when the number of electrodes increases.

FIGS. 16(A) and 16(B) show a touch panel 1e according to the firth embodiment of the present invention, and FIG. 16(A) is a plan view, and FIG. 16(B) is a transverse section view of the center of the plan view. In FIGS. 16(A) and 16(B), the element corresponding to the element shown in FIGS. 1(A) and 1(B) are denoted by the same reference numeral, and overlapping description will be omitted.

In touch panel 1e shown in FIGS. 16(A) and 16(B), piezoelectric sheet 3 is bonded together with surface protection film 2 that is formed, for example, from a glass plate, and surface protection film 2 is fixed to base body 5 with a spacer 81 interposed therebetween. In this embodiment, the gap between piezoelectric sheet 3 and base body 5 is left as a space rather than being filled with a rubber elastic body.

In FIG. 16(A), surface protection film 2 is depicted in such a state that those situated under the same are seen through. In FIGS. 16(A) and 16(B), illustration of electrodes is omitted.

The diagonal direction of piezoelectric sheet 3 is not coincident with stretching axial direction 10, and it is bonded with surface protection film 2 with a curable adhesive 82 in the region extending in the diagonal direction, and is bonded with surface protection film 2 with a non-curable adhesive 83 in the remaining region. As curable adhesive 82 and non-curable adhesive 83, those having high transparency are preferably used. Therefore, when highly transparent curable adhesive 82 and non-curable adhesive 83 are used, the adhesives themselves and boundaries thereof are not visible.

Since non-curable adhesive 83 has relatively large elasticity or plasticity, the piezoelectric sheet is able to slightly deviate from surface protection film 2 when surface protection film 2 deforms. On the other hand, the part bonded by curable adhesive 82 contracts with elongation and contraction of surface protection film 2. Therefore, it is possible to produce the effect similar to that obtained when tension is applied along the diagonal line represented by arrows 11a and 11b in FIGS. 1(A) and 1(B).

Touch panel 1e shown in FIGS. 16(A) and 16(B) can be further thinned because touch panel 1e does not have a rubber elastic body. By forming surface protection film 2 from a glass plate, it is possible to obtain a touch panel that is beautiful to the eye and resistant to impact and scratch. In this case, the glass plate that forms surface protection film 2 is sufficiently thinned to such a degree that permits deformation of piezoelectric sheet 3.

REFERENCE SIGNS LIST 1, 1a, 1b, 1c, 1e touch panel
2 surface protection film
3, 30 piezoelectric sheet
3a, 3b main surface
10, 33 stretching axial direction
11a, 11b tension direction
21 to 25, 21a to 25a, 21b to 25b, 41a to 46a, 51a to 56a, 51b to 56b electrode
70 pressing operation point
71 to 74 grid point
82 curable adhesive
83 non-curable adhesive
100 touch-type input apparatus
101 processor
102 detection unit
103 operation unit
104 storage unit

The invention claimed is:

1. A touch panel comprising:
a piezoelectric sheet having a first region and a second region; and
a surface protection film bonded to the second region of the piezoelectric sheet with a non-curable adhesive,
wherein the non-curable adhesive has a larger elasticity than a material that bonds the first region of the piezoelectric sheet to the surface protection film.

2. The touch panel according to claim 1, wherein the first region of the piezoelectric sheet is bonded to the surface protection film with a curable adhesive.

3. The touch panel according to claim 2, wherein the first region extends in a diagonal direction of the piezoelectric sheet.

4. The touch panel according to claim 3, wherein the diagonal direction is not coincident with a stretching axial direction of the piezoelectric sheet.

5. The touch panel according to claim 1, wherein the first region extends in a diagonal direction of the piezoelectric sheet.

6. The touch panel according to claim 5, wherein the diagonal direction is not coincident with a stretching axial direction of the piezoelectric sheet.

7. The touch panel according to claim 2, wherein the non-curable adhesive and curable adhesive are transparent.

8. The touch panel according to claim 1, wherein the surface protection film is a glass plate.

9. The touch panel according to claim 1, further comprising:
- a base body; and
- a spacer fixing the base body to the surface protection film.

10. The touch panel according to claim 1, wherein the piezoelectric sheet is poly-L-lactic acid.

11. The touch panel according to claim 10, wherein the piezoelectric sheet has a stretching axis oriented in a predetermined direction and has first and second opposed surfaces, the touch panel further comprising:
- a plurality of first electrodes distributed discretely in plural positions on the first surface of said piezoelectric sheet; and
- a plurality of second electrodes distributed discretely in plural positions on the second surface of said piezoelectric sheet and respectively opposing the plurality of first electrodes so as to form a plurality of sets of opposed electrodes.

12. The touch panel according to claim 11, wherein among said plurality of first and second electrodes, electrodes that are situated in an outer circumferential part of said piezoelectric sheet are electrodes selected from the group consisting of aluminum, copper, gold and nickel.

* * * * *